Patented Nov. 19, 1929

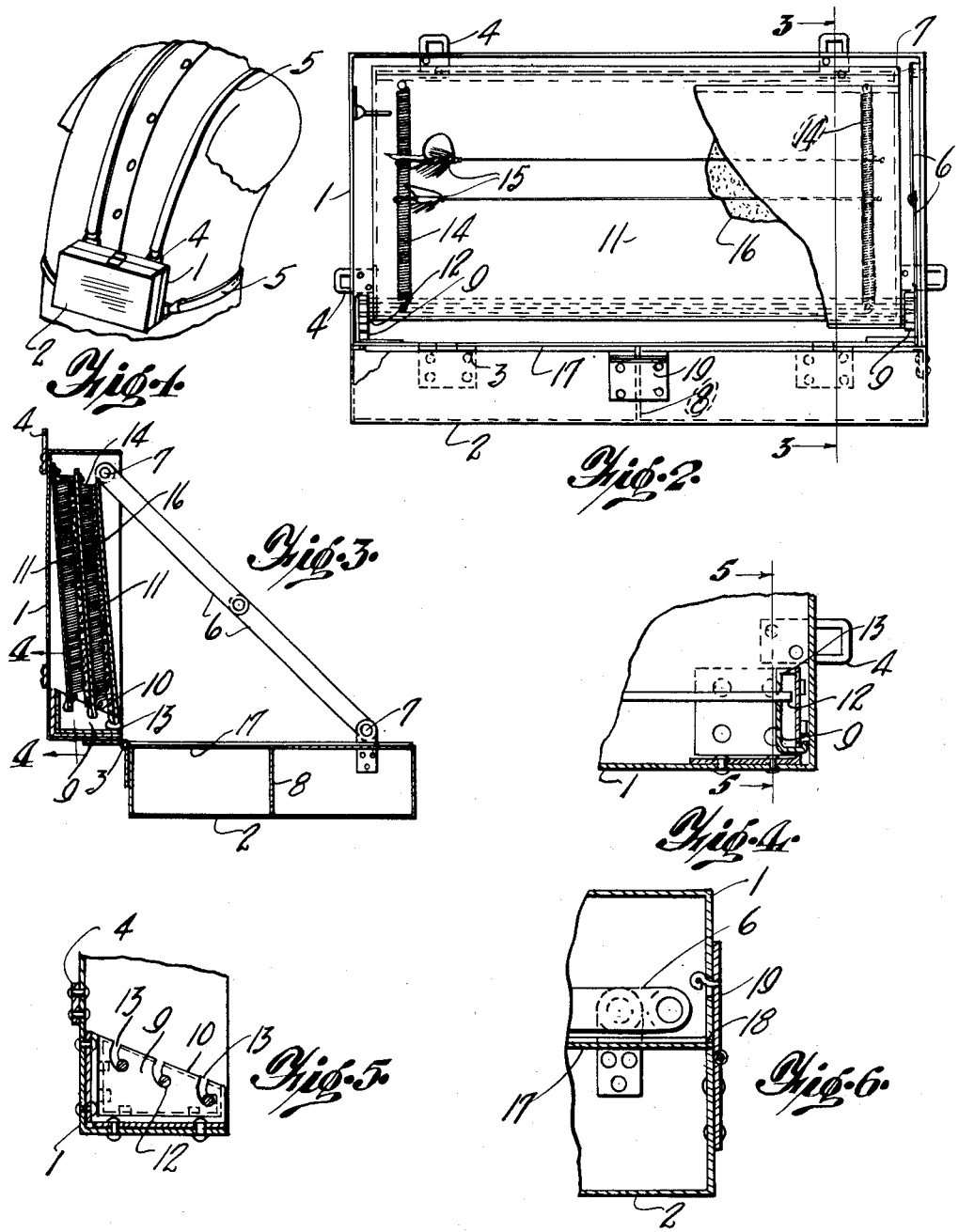

1,736,337

UNITED STATES PATENT OFFICE

ARNOLD EUGENE BOREL, OF BUTTE, MONTANA

FISHERMAN'S FLY AND TACKLE CASE

Application filed August 20, 1928. Serial No. 300,653.

This invention is a fly and tackle case for fishermen, and the object is to provide in a compact form, means for conveniently carrying a plurality of flies such as ordinarily used by fishermen, combined with means for carrying general fishing tackle, such as lines, corks, leads and hooks.

In the drawing

Figure 1 is a perspective view showing the case as strapped in position upon the body of the user;

Figure 2 is a frontal elevation, the lid of the case being raised;

Figure 3 is a section on the line 3—3 of Figure 2;

Figure 4 is a sectional detail on the line 4—4 of Figure 3;

Figure 5 is a sectional detail on the line 5—5 of Figure 4;

Figure 6 is an enlarged sectional detail of a frontal portion of the case in its closed position.

The invention comprises a suitable double box made up of sections 1 and 2, hinged together at 3. Loops 4 are extended from the section 1, through which straps 5 are run for fastening the box upon the wearer as shown in Figure 1. As thus positioned upon the wearer, it will be noted that the section 1 is held constantly in a vertical position, while the section 2 may be lowered to a horizontal position as shown in Figure 3, thus opening the box. A pair of folding arms 6 at each end of the structure serve to retain the section 2 in a horizontal position, the ends of these straps being pivoted at 7 to the elements 1 and 2. The section 2 of the assembly may be partitioned in any way desired and as shown at 8, for the convenient placement of the ordinary fishing tackle used by a fisherman. Within the lower corners of the section 1, are mounted leaf holders 9, the same having their free edges inclined as shown at 10 and having L-shaped notches 13 cut therein in spaced relation. A plurality of fly leaves 11 are provided, the same being made of any suitable material, as celluloid or aluminum, and having laterally extended hangers 12 at their intended inner margins for releasably engaging the L-shaped notches 13 of the holders 9 at opposite ends of the case. Thus the leaves 11 may be readily inserted or removed from the case, as may be desired. Coil springs 14 are mounted at either end of each leaf 11, for the convenient holding of the flies 15. Moisture pads 16 are mounted upon the opposite sides of the leaves 11, for keeping the flies in proper condition. A lid 17 is slidably mounted in grooves 18 cut in the ends of the section 2. A suitable latch 19 serves to hold the portion 1—2 in closed relation.

The use of the device will be apparent from the foregoing description.

While I have herein described a certain specific manner and method of constructing and assembling the elements of my invention, it is understood that I may vary from the same in minor details, not departing from the spirit of my invention, so as best to construct a practical device for the purpose intended, as defined in the appended claim.

I claim:

In a device of the kind described, a doublebox structure of two sections hingedly connected, leaf holders mounted within the inner corners of one of the sections, the said holders having inclined free edges and there being a plurality of L-shaped notches cut in the inclined edges of the leaf holders in spaced relation, and a plurality of fly leaves having laterally extended hangers adapted for insertion within the said L-shaped slots of the leaf holders.

In testimony whereof I affix my signature.

ARNOLD EUGENE BOREL.